US009043754B2

(12) United States Patent
Fortier et al.

(10) Patent No.: US 9,043,754 B2
(45) Date of Patent: May 26, 2015

(54) VIRTUALIZING EMBEDDED DEVICES

(75) Inventors: Dominique Fortier, Issaquah, WA (US);
Poonam Sigroha, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 970 days.

(21) Appl. No.: 12/979,392

(22) Filed: Dec. 28, 2010

(65) Prior Publication Data

US 2012/0167044 A1 Jun. 28, 2012

(51) Int. Cl.
*G06F 9/455* (2006.01)
*G06F 9/44* (2006.01)

(52) U.S. Cl.
CPC .............. *G06F 9/455* (2013.01); *G06F 9/4411* (2013.01); *G06F 9/45529* (2013.01); *G06F 9/45504* (2013.01); *G06F 9/4406* (2013.01)

(58) Field of Classification Search
CPC ..... G06F 9/44; G06F 15/177; G06F 11/3089; G06F 21/44; G06F 9/455; G06F 9/45504; G06F 9/45529; G06F 9/4406; G06F 9/4411
USPC .......................................... 717/121; 709/220
See application file for complete search history.

(56) References Cited

U.S. PATENT DOCUMENTS

| | | | |
|---|---|---|---|
| 7,017,004 B1 * | 3/2006 | Calligaro et al. | 711/102 |
| 7,685,257 B2 * | 3/2010 | King et al. | 709/219 |
| 8,555,273 B1 * | 10/2013 | Chia et al. | 717/173 |
| 2002/0133581 A1 | 9/2002 | Schwartz et al. | |
| 2003/0005107 A1 * | 1/2003 | Dulberg et al. | 709/223 |
| 2007/0072599 A1 * | 3/2007 | Romine et al. | 455/423 |
| 2007/0219059 A1 * | 9/2007 | Schwartz et al. | 482/8 |

(Continued)

FOREIGN PATENT DOCUMENTS

| | | |
|---|---|---|
| CN | 101138489 A | 3/2008 |
| CN | 101331781 A | 12/2008 |

(Continued)

OTHER PUBLICATIONS

"International Search Report", Mailed Date: Sep. 20, 2012, Application No. PCT/US2011/067364, Filed Date: Dec. 27, 2011, pp. 10.

(Continued)

*Primary Examiner* — John Breene
*Assistant Examiner* — Lynda Dinh
(74) *Attorney, Agent, or Firm* — Henry Gabryjelski; Kate Drakos; Micky Minhas

(57) ABSTRACT

A device virtualization system is described herein that separates common computer processing tasks of an embedded device from the application-specific peripherals of the embedded device to allow at least some functions of the device to be offloaded to servers or other computing devices. The device virtualization system greatly simplifies management, configuration, and control of virtual embedded devices. Because much of the software of the device runs on the virtualization server, information technology (IT) personnel can be assigned to manage the virtualization server and to apply any updates and diagnose any problems that occur. Moreover, a single server or group of servers can be used to provide virtualization services for a wide variety of virtualized embedded devices for a wide variety of users. Thus, the system enhances the usefulness of embedded devices and allows a longer lifetime and wider variety of uses than embedded devices today.

20 Claims, 4 Drawing Sheets

(56) References Cited

U.S. PATENT DOCUMENTS

| | | | |
|---|---|---|---|
| 2008/0133767 A1* | 6/2008 | Birrer et al. | 709/231 |
| 2008/0320081 A1 | 12/2008 | Shriver-Blake et al. | |
| 2009/0222497 A1* | 9/2009 | Ryan | 707/204 |
| 2009/0299920 A1 | 12/2009 | Ferris et al. | |
| 2010/0042720 A1 | 2/2010 | Stienhans et al. | |
| 2010/0131590 A1 | 5/2010 | Coleman et al. | |
| 2011/0191787 A1* | 8/2011 | Poleg et al. | 719/328 |

FOREIGN PATENT DOCUMENTS

| | | | |
|---|---|---|---|
| EP | 1187015 A2 | 3/2002 | |
| KR | 1020020034347 A | 5/2002 | |
| KR | 1020040081988 A | 9/2004 | |

OTHER PUBLICATIONS

Posey, Brien, "Virtualization: The Right Way Forward is the Hypervisor Agnostic Approach", Retrieved at << http://www.2x.com/blog/2010/10/virtualization/virtualization-%E2%80%93-the-right-way-forward-is-the-hypervisor-agnostic-approach/ >>, Oct. 5, 2010, pp. 2.

Farkas, Keith I., "Interview: Pervasive computing", Retrieved at << http://ieeexplore.ieee.org/stamp/stamp.jsp?tp=&arnumber=5280679 >>, Annual Index, vol. 8, No. 4, Oct.-Dec. 2009, pp. 24-27.

"ScaleMP Versatile SMP: High Performance Computing Virtualization Podcast with Benjamin Baer from ScaleMP", Retreived at << http://www.dabcc.com/article.aspx?id=15611 >>, Aug. 2, 2010, pp. 4.

"John Muir Health Adopts VMware's SpringSource tc Server to Streamline Application Deployment", Retrieved at << http://www.vmware.com/company/news/releases/john-muir-spring.html >>, Aug. 11, 2010, pp. 2.

"Design Talk: Software", Retrieved at << http://www.ecnmag.com/article-design-talk-software-111609.aspx >>, Nov. 16, 2009, pp. 8.

Hermeling, Mark, "Analysis: The evolution of the hypervisor", Retrieved at << http://www.electronicsweekly.com/Articles/2010/09/22/49499/analysis-the-evolution-of-the-hypervisor.htm >>, Sep. 22, 2010, pp. 4.

"First Office Action and Search Report Issued in Chinese Patent Application No. 201110446026.5", Mailed Date: May 19, 2014, Filed Date: Dec. 27, 2011, 17 Pages.

"Second Office Action Issued in Chinese Patent Application No. 201110446026.5", Mailed Date: Jan. 12, 2015, 13 Pages.

* cited by examiner

VIRTUALIZING EMBEDDED DEVICES

BACKGROUND

Embedded devices are everywhere today, in homes, workplaces, malls, and so forth. Embedded devices include everything from set-top boxes for cable service, to game consoles, refrigerators, hospital equipment, power monitoring devices, retail kiosks, information booths, and so forth. Embedded devices typically include similar components to desktop computers: a central processing unit (CPU), memory, storage devices, sometimes a graphics-processing unit (GPU), and peripherals specific to the device's purpose. For example, a digital video recording (DVR) set top box may include a tuner peripheral, while a hospital x-ray machine may include an x-ray capturing peripheral.

Embedded devices are powerful, but often limited in purpose. The embedded device manufacturer often makes a number of tradeoffs to reduce the cost of goods (COGs) and bill of materials (BOMs) used to build the device. Updating embedded devices may involve flashing firmware, a task that many users are not comfortable doing. Thus, embedded devices are often sold once for a single purpose and if a manufacturer wants to enable new functionality or faster processing, then the manufacturer often attempts to sell the user a replacement embedded device that is a newer version.

Embedded devices create a lot of waste as users often get rid of the device when it no longer servers its specific purpose. For example, a DVR may be replaced with a new DVR with more storage capacity, or a hospital may replace an ultrasound machine with one that includes a color printer or three-dimensional imaging. If errors are found in embedded devices, it is time consuming and difficult to identify all of the instances with the problem and provide firmware updates to fix the errors. Thus, management and control of embedded devices is often a problem. In addition, configuration and installation of some devices may be beyond the level of skill of ordinary users, such that expensive technician time is involved in the initial setup of the device.

SUMMARY

A device virtualization system is described herein that separates common computer processing tasks of an embedded device from the application-specific peripherals of the embedded device to allow at least some functions of the device to be offloaded to servers or other computing devices. At one extreme, a virtual embedded device using the system is just a set of remote peripherals running at the user's location that provide input and output communicated to a virtualization server running at another location. The device virtualization system greatly simplifies management, configuration, and control of virtual embedded devices. Because much of the software of the device runs on the virtualization server, information technology (IT) personnel can be assigned to manage the virtualization server and to apply any updates and diagnose any problems that occur. Moreover, a single server or group of servers can be used to provide virtualization services for a wide variety of virtualized embedded devices for a wide variety of users. The IT personnel can apply updates, diagnose configuration problems, assist with setting up the device to work in the user's environment, and so forth.

In addition, when problems are identified, a device manufacturer can have access to a much greater number of devices by monitoring input and output to a datacenter that virtualizes the devices. This greatly simplifies testing and diagnosis of problems. In addition, the manufacturer can ship a much cheaper device to the user's location and can charge the user based on a subscription model for the services provided by the virtualization server that give the virtualized embedded device its core functionality. This allows users to benefit from regular updates without the maintenance and technical hassle of flashing firmware updates. By installing the cheaper, slimmed-down device at multiple locations, multiple users can also share processing power of a single virtualized device to save cost. Thus, the system enhances the usefulness of embedded devices and allows a longer lifetime and wider variety of uses than embedded devices today.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
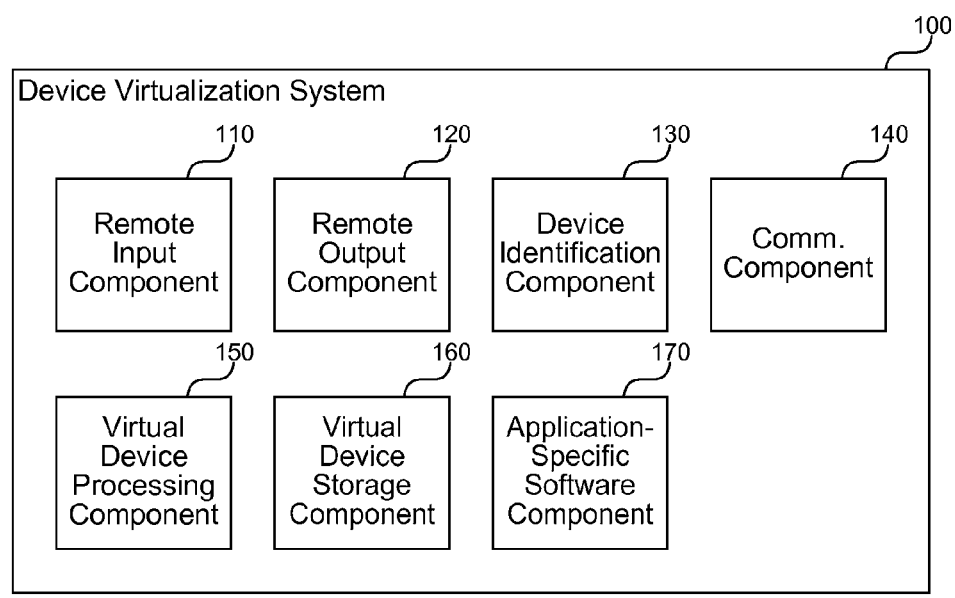
FIG. 1 is a block diagram that illustrates components of the device virtualization system, in one embodiment.

A device virtualization system is described herein that separates common computer processing tasks of an embedded device from the application-specific peripherals of the embedded device to allow at least some functions of the device to be offloaded to servers or other computing devices (i.e., a virtual device). At one extreme, a virtual embedded device using the system is just a set of remote peripherals running at the user's location that provide input and output communicated to a virtualization server running at another location. For example, a datacenter may provide the processing and storage capabilities for a number of virtual embedded devices. As one example, consider a set-top box with DVR functionality. Today the DVR has a fixed amount of storage based on a local hard drive installed in the device. If the hard drive beings to fill up, the DVR is programmed to begin deleting old recorded shows and/or to avoid recording new ones. Today's DVR is a self-contained device with a single purpose. By virtualizing the DVR, some components and functions can be moved to a datacenter or other location. For example, storage and processing capabilities for the device can be offloaded to a datacenter, while tuners and connections to audio/visual equipment in the home remain. A user could pay for virtually unlimited storage in a datacenter so that the virtualized DVR does not run out of storage space.

In addition, the device virtualization system greatly simplifies management, configuration, and control of virtual embedded devices. Because much of the software of the device runs on the virtualization server, information technology (IT) personnel can be assigned to manage the virtualization server and to apply any updates and diagnose any problems that occur. Moreover, a single server or group of servers can be used to provide virtualization services for a wide variety of virtualized embedded devices for a wide variety of users. The IT personnel can apply updates, diagnose configuration problems, assist with setting up the device to work in the user's environment, and so forth. In addition, when problems are identified, a device manufacturer can have access to a much greater number of devices by monitoring input and output to a datacenter that virtualizes the devices. This greatly simplifies testing and diagnosis of problems. In addition, the manufacturer can ship a much cheaper device to the user's location and can charge the user based on a subscription model for the services provided by the virtualization server that give the virtualized embedded device its core functionality. This allows users to benefit from regular updates without the maintenance and technical hassle of flashing firmware updates. By installing the cheaper, slimmed-down device at multiple locations, multiple users can also share processing power of a single virtualized device to save cost. For example, a hospital may give doctors at various locations a display device that provides output from a single shared magnetic resonance imaging (MRI) or other diagnostic machine located at one hospital. Thus, the system enhances the usefulness of embedded devices and allows a longer lifetime and wider variety of uses than embedded devices today.

The device virtualization system leverages the power, versatility, location, and cost structure of servers to deliver functionality of various embedded devices. Many companies are currently building datacenters that are well suited to performing some of the tasks of embedded devices today. In some embodiments, a virtual embedded device includes a handheld screen or a monitor while the entire processing power resides in a virtualization server somewhere remote. It is seamless to the user as if they are using a real embedded device or a virtual device. Consider an MRI, ultrasound, or other medical diagnostic machine, for example, sitting somewhere in a remote location while the doctor/nurse only has a handheld scanner with them that they can carry with themselves easily. This diagnostic machine is powerful enough to be able to process multiple requests at the same time. This way the maintenance costs go down as there is only one powerful machine at one location maintained by single team shared by multiple hospitals and hence the maintenance costs are shared as well. The virtualization for the device is achieved by virtualizing at the operating system level just like desktop clients and servers. Any updates are pushed to the central device as opposed to multiple distributed devices. This is truly virtualizing the embedded devices themselves to be able to get all the benefits of virtualization as opposed to using the virtual machines. This allows for a service-based model for devices as opposed to selling repeatedly improved physical devices. If any hospital, for example, just needs to use one specific service from this device, they can just pay for that one service.

In some embodiments, each embedded device is like a dumb terminal with all processing power is pushed to a remote virtual machine. This means that the embedded devices can appear to process a lot more information compared to today and the device manufacturers do not have to worry about the processing power as well as footprint since the virtual machine can be as powerful as a desktop, server, or mainframe. The system allows the devices to be managed more like desktop clients and servers. The system enables generalization and standardization of approach for all devices as opposed to building specialized knowledge for embedded devices today. This helps build a more consistent device experience and makes it easier to write applications across devices with only changes for resolution/display and particular peripherals that can be controlled at the dumb terminal level. At this point, the embedded devices are more seamless like desktop clients and servers. An application written for one device can be leveraged seamlessly and interchangeably for many embedded devices. The virtual machines sitting behind these embedded devices can identify any application, operating system, or security patch updates and be able to download and/or schedule them with/without user permission based on the policies set up. This makes the device experience simple, seamless, integrated, powerful, and standard across devices regardless of which device is being used from the manufacturer. Different manufacturers can still control their market based on the experience they create and processing power they are able to provide with the support and service of the virtual machines. This allows for greater flexibility using a service-based model for devices where much of each device resides in the cloud.

Virtual devices can serve a wide variety of purposes. For example, a television implementing the system may offload processing of video data to a data center. Video playback typically involves the use of one or more codecs to decompress and interpret video and audio data from a storage format to a playback format. Codecs change over time to add more compression, additional features (e.g., more speaker channels, three dimensional data, and so forth), and so on. It is often difficult for embedded devices to keep up with codec updates, which may result in an inability to playback certain types of content. Today this is handled through firmware updates, if the manufacturer makes one available, or purchasing a new device if the manufacturer does not. The device virtualization system can perform processing at a remote data center or other location that is frequently and automatically updated with new codecs and/or other improvements.

In addition, the device virtualization system allows one embedded device to potentially be used for multiple functions by subscribing to additional remote services. For example, a game console may include an optical drive and connections to a user's audiovisual equipment in the home for playing games. The user may later pay for additional services, such as the ability to play movies using the game console's optical drive, the ability to browse the Internet, and so forth. The device includes the hardware for these services, and may leverage processing and logic stored remotely to add additional functions. The user may even stop paying for the use of the device as a game console, so that the device's purpose for the user changes over time.

FIG. 1 is a block diagram that illustrates components of the device virtualization system, in one embodiment. The system 100 includes a remote input component 110, a remote output component 120, a device identification component 130, a communication component 140, a virtual device processing component 150, a virtual device storage component 160, and an application-specific software component 170. Each of these components is described in further detail herein.

The remote input component 110 captures input at an embedded device from one or more input devices installed in the embedded device. The type of input varies depending on the purpose of the embedded device. For a DVR, the input may include tuner input in the form of compressed audiovisual data representing a television show or input from a remote control through which a user requests to record a program or change the channel. For a hospital x-ray machine, the input may include x-ray imaging data. The number and variety of embedded devices are substantial, and those of ordinary skill in the art will recognize many types of devices that could provide input to the remote input component 110. Unlike previous systems, however, the remote input component 110 packages the input for transmission via the communication component 140 to a remote virtualization device.

The remote output component 120 receives output at an embedded device and provides the output to a user or other components. The output may include visual output, such as display to a screen or monitor, auditory output, such as playing a sound through speakers, mechanical output, such as moving an object with a robot arm or other peripheral, and so on. The type of output varies based on the purpose of the embedded device. The remote output component 120 receives the output after processing via a remote virtualization device through the communication component 140. Unlike traditional embedded devices, some or all of the processing of input occurs at a remote virtualization device and the local embedded device is primarily responsible for capturing input and providing output.

The device identification component 130 identifies a particular embedded device and informs the virtual device processing component 150 so that the virtual device can provide any application-specific processing. The virtualization device may perform processing and/or storage for a variety of embedded devices, and the device identification component 130 allows the virtualization device to understand both the type and instance of the embedded device for which the virtualization device is performing processing. The type of the device will help the virtualization device to load any application specific software code via the application-specific software component 170 and to perform any specialized processing. The instance of the device may help the virtual device monitor status of a subscription or payment to determine if the particular embedded device is authorized to request the services of the virtualization device.

The communication component 140 provides a communication channel between the embedded device and a virtualization device. The channel may include public networks, such as the Internet, as well as private networks, such as an enterprise local area network (LAN). The channel may use a variety of well-known protocols to transport data, such as transmission control protocol (TCP) or user datagram protocol (UDP). The communication component 140 may include hardware installed in the embedded device for creating a connection with the device as well as a small amount of infrequently changing software for monitoring the connection and processing any received output.

The virtual device processing component 150 provides processing resources at a virtualization device for performing actions related to a purpose of the embedded device. For example, if the embedded device is a refrigerator, then the processing component 150 may monitor the temperature and instruct a compressor to run until a specified temperature is reached. The virtual device processing component 150 receives device identification information from the device identification component 130 and invokes the application-specific software component 170 to load any application software code that is specific to the operation of the identified embedded device. If the application software code has been superseded by an updated version, the virtual device processing component 150 may transparently update the application software code before performing any processing or perform any other maintenance tasks determined automatically or by IT personnel managing the virtualization device.

The virtual device processing component 150 can also export processing tasks to a cloud-computing service, such as MICROSOFT™ AZURE™ or Amazon EC2 that offers flexible processing resources on a subscription or other basis. The entire system 100 can be built in on a cloud platform so that a local embedded device at the user's site captures input and provides output, while the cloud platform provides processing, storage, and other resources. This creates a very scalable model and lowers the price to manufacturers of releasing new embedded devices. With the ability to both make the embedded device itself cheaper and to avoid expensive build-out costs for an online service, the manufacturer can focus on solving specific problems. As the popularity of the device/solution grows, the manufacturer can quickly make more embedded devices and utilize more resources of the cloud platform to scale smoothly.

The virtual device storage component 160 provides storage resources at the virtualization device for persistently storing data on behalf of the embedded device. The storage resources may include one or more in-memory data structures, files, file systems, hard drives, external storage devices, databases, storage area networks (SANs), cloud-based storage services, or other facilities for persistently storing data between communications with the embedded device. For example, if the embedded device provides access to content, such as a DVR or backup device, then the virtual device storage component 160 may store audiovisual files or backed up data on behalf of the embedded device. Rather than buying a traditional backup device with a fixed size the user can buy a backup device that communicates with the virtual device to provide the user with as much storage as the user needs or wants to pay for. Over time, the user's needs may change so that more or less storage is needed, but the user can continue to get value out of the same embedded device and adjust the user's subscription plan based on the changing needs.

The application specific software component 170 manages any processes that are specific to an application for which the embedded device is designed. The component 170 may include software code and hardware components that can be installed and used centrally at a location of the virtualization device and remote from the embedded device. Where the application specific software component 170 represents software code, the software code can be centrally updated and managed by updating the software at the virtualization device without access or even knowledge of the various embedded devices that exist at various locations. The next time the user uses the embedded device after an update, the user may simply find that the device has been updated with new functionality or corrected errors based on updates that occurred at the virtualization device. A particular virtualization server may provide processing and storage services for a variety of types of embedded devices and purposes by storing and loading multiple application-specific software components 170 as needed.

The computing device on which the device virtualization system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
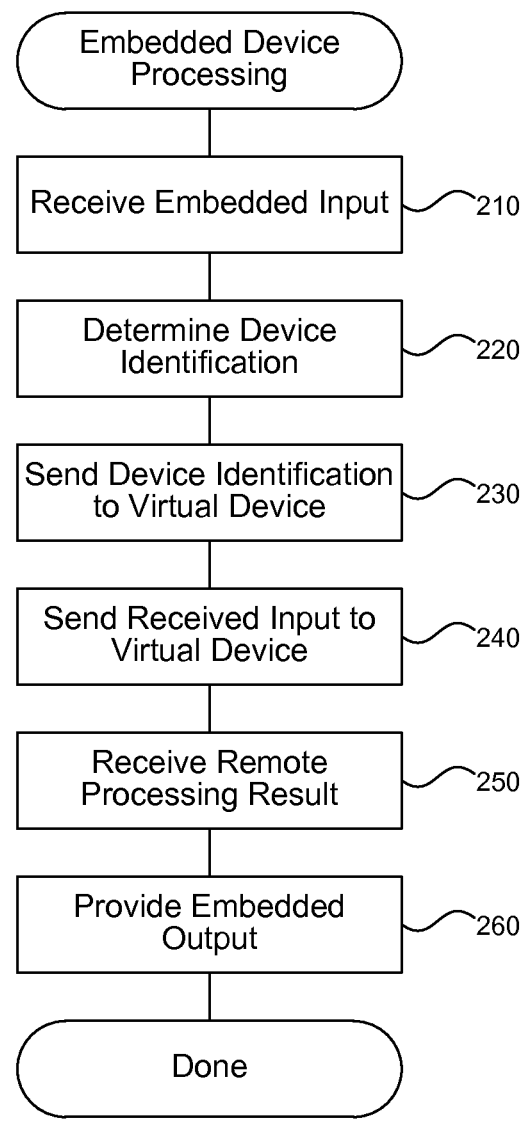
FIG. 2 is a flow diagram that illustrates processing of the device virtualization system to capture information at a virtual embedded device for remote processing, in one embodiment.

FIG. 2 is a flow diagram that illustrates processing of the device virtualization system to capture information at a virtual embedded device for remote processing, in one embodiment. Beginning in block 210, the system receives at an embedded device input from one or more sensors or peripherals attached to the embedded device. The embedded device provides the sensory input for a virtual device located in a datacenter, other centralized location, or on a computing system collocated with the embedded device to provide processing, storage, or other resources to the embedded device and potentially one or more other embedded devices. The embedded device may be connected to the virtual device via the Internet or a private network to provide input to and receive output from the virtual device. The sensors or peripherals installed within the embedded device capture one or more types of input data from an environment surrounding the embedded device and provide the input to the virtual device. For example, the data may include tuner input, temperature input, audio input, video input, mechanical input, and so on.

Continuing in block 220, the system identifies the embedded device from which the input was received. The embedded device may include a device identifier stored within a read only memory (ROM) or other local storage that identifies a type and/or instance of the device. The type may specify a purpose of the embedded device, whereas the instance may specify a serial number or other substantially unique identifier for distinguishing devices of the same type. The embedded device provides the device identifier to the virtual device so that the virtual device knows how to handle the received input.

Continuing in block 230, the system sends the device identification to the virtual device for processing. The embedded device sends the device identifier via the connected network and may perform a setup phase during which the embedded device opens a channel of communication with the virtual device and identifies itself once for use in one or more subsequent communications to provide input to and receive output from the virtual device. Based on the received device identification, the virtual device loads any application-specific instructions for handling input from the embedded device.

Continuing in block 240, the system sends the received input to the virtual device for processing. The virtual device performs any application-specific processing on the received input and produces a result or other output. The type of processing can vary as widely as the types of embedded devices available. For a DVR capturing a recording, the virtual device may receive tuner input from the embedded device, compress/encode the input, and store the input in storage associated with the virtual device. For a DVR performing playback, the virtual device may receive control requests such as play, pause, and fast forward, and provide encoded audiovisual data as output that can be played back on a display of the embedded device. Other types of devices may request different types of processing from the virtual device with the net result that the embedded device offloads a fair amount of processing and other resource consumption to the virtual device in comparison to today's devices that perform substantially all functions on the embedded device itself at noticeable hardware cost.

Continuing in block 250, the system receives at the embedded device a remote processing result from the virtual device. The remote processing result may include a result code that indicates whether processing the sent input failed or succeeded, as well as any output provided by the virtual device as a result of the processing performed by the virtual device. In some cases, the virtual device simply stores data on behalf of the embedded device, and the processing result may include data requested by the embedded device from the virtual device. In other cases, the processing result may include the result of substantial computation performed by the virtual device on behalf of the embedded device.

Continuing in block 260, the system provides at the embedded device output received from the virtual device. The output may include audiovisual data played back on a screen or set of speakers, mechanical data provided to a mechanical peripheral such as a robotic arm, binary data such as previously backed up data stored to the virtual device, or any other type of data. After block 260, these steps conclude.

Figure 3:
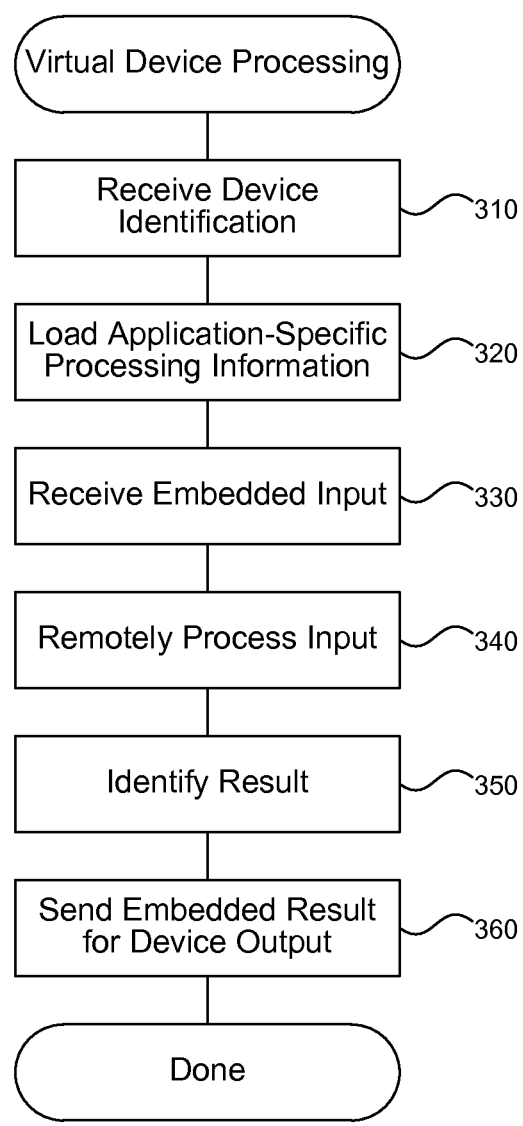
FIG. 3 is a flow diagram that illustrates processing of the device virtualization system to process virtual device information at a common virtualization facility, in one embodiment.

FIG. 3 is a flow diagram that illustrates processing of the device virtualization system to process virtual device information at a common virtualization facility, in one embodiment. Beginning in block 310, the system receives at a virtual device information identifying an embedded device that relies upon the virtual device for processing or other resources to perform a function of the embedded device. The embedded device may send a device identifier along with the received input that identifies a type and/or instance of the device. The type may specify a purpose of the embedded device, whereas the instance may specify a serial number or other substantially unique identifier for distinguishing devices of the same type. The virtual device determines the device type of the embedded device and loads any application-specific processing information from a data store associated with the virtual device. A manufacturer of the embedded device may provide application-specific software code or other information for managing the embedded device to an operator of the virtual device initially as well as periodic updates to fix errors or upgrade functionality over time.

Continuing in block 320, the system loads application-specific information related to the embedded device based on the received device information. The virtual device may include a data store with storage that contains a variety of application-specific processing instructions for the virtual device to act on behalf of a variety of embedded devices. The virtual device can provide processing, storage, or other resources to the embedded device, enabling the embedded device to reduce or eliminate some components and cost.

Continuing in block 330, the system receives at the virtual device embedded input from one or more peripherals installed in the embedded device. The received input forms the input that would previously have been processed at the embedded device but is instead processed at the virtual device. The input may include tuner input, temperature input, audio input, video input, mechanical input, and so on. The embedded device sends one or more input messages over a network connecting the embedded device to the virtual device, and the virtual device receives the input and performs specified processing.

Continuing in block 340, the system processes the received embedded input at the virtual device based on the application-specific information. The processing may include storing data on behalf of the virtual device, performing computations on the input, gathering additional data from other sources (e.g., a public database), and so forth. The virtual device provides a processor, storage, and other resources to act on the input provided by the embedded device. This allows the embedded device to omit these resources or use simpler versions of the resources to reduce embedded device cost and simplify embedded device configuration and maintenance.

Continuing in block 350, the system identifies one or more results of processing the embedded input. The results may include an error code, a success code, output data, derived information, and so forth. The processing of the virtual device produces output that would have previously been generated at the embedded device in past systems. The virtual device then provides the produced output to the embedded device so that a user of the embedded device may be unaware that the embedded device is not performing all of the operations itself. The device virtualization system is made possible, in part, by the nearly ubiquitous availability of fast networking connections between a variety of computing devices.

Continuing in block 360, the system sends the identified results from the virtual device to the embedded device as output to provide to a user of the embedded device. The results may include video data for the embedded device to playback on a monitor, sound data for playback on speakers, mechanical data for controlling a mechanical peripheral of the embedded device, and so on. After block 360, these steps conclude.

Figure 4:
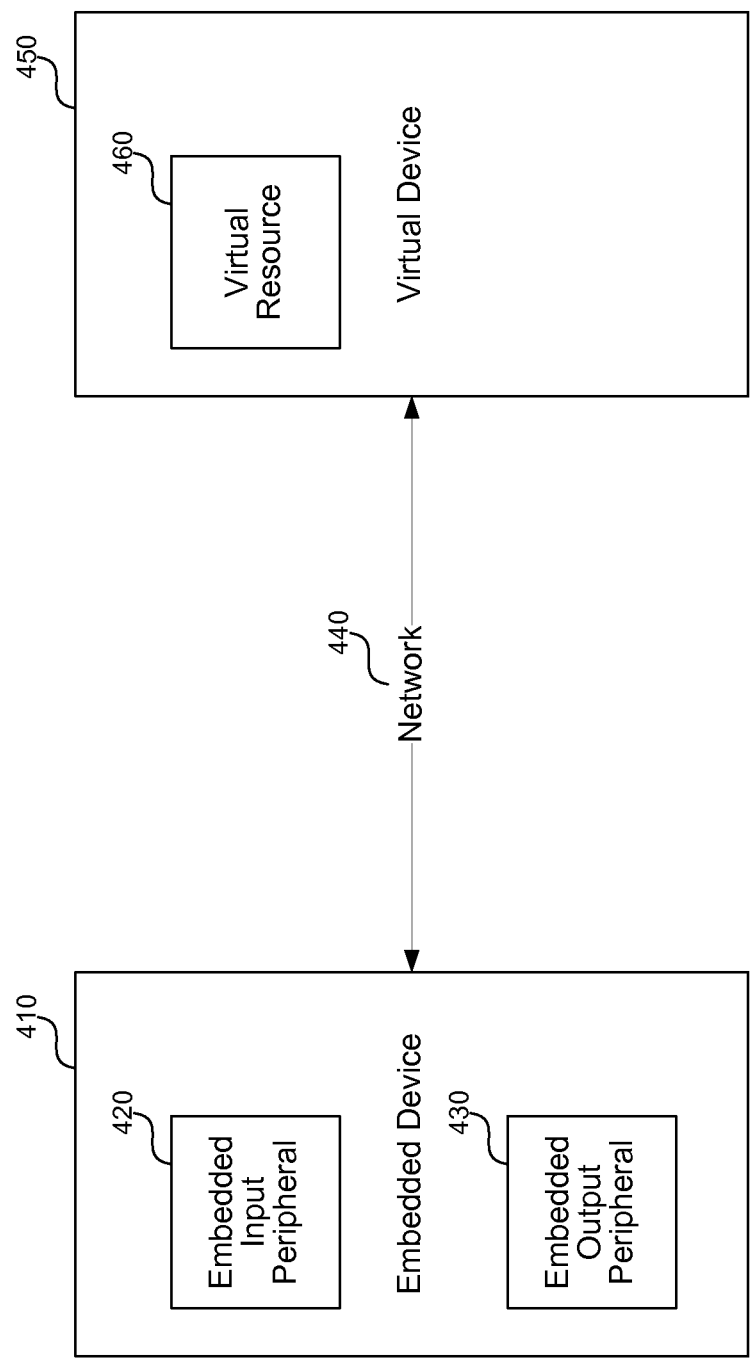
FIG. 4 is a block diagram that illustrates an exemplary operating environment of the device virtualization system, in one embodiment.

FIG. 4 is a block diagram that illustrates an exemplary operating environment of the device virtualization system, in one embodiment. The diagram includes an embedded device 410 and a virtual device 450 connected by a network 440. The embedded device 410 may be installed in a home, small office, or other environment that includes local information and for which a user has purchased the embedded device 410 to carry out some purpose. The embedded device includes one or more embedded input peripherals 420 and one or more embedded output peripherals 430 that gather data from and provide feedback to the local environment of the embedded device 410. The network 440 connecting the embedded device 410 and virtual device 450 can include the Internet or any other network sufficiently fast to allow the virtual device 450 to perform one or more functions on behalf of the embedded device 410 and return data to the user without undue delay.

The virtual device 450 may be remotely located in a data-center or other processing facility or may be a server or other available resource at the location of the embedded device 410. The virtual device 450 includes at least one virtual resource 460 used by the embedded device 410 to perform one or more functions traditionally performed by the embedded device 410. The virtual resource 460 may include a processor, storage device, networking device, or other resource that acts on behalf of the embedded device 410, and potentially other embedded devices (not shown). The virtual device 450 enables centralized management of application code associated with the embedded device 410 as well as sharing of the virtual resource 460 and cheaper component cost of the embedded device 410.

In some embodiments, the device virtualization system simulates one or more embedded devices using the virtual device to assist an embedded device manufacturer with testing software code or other information related to the embedded device. Rather than setting up a complex test bench of hardware, the manufacturer can test many scenarios including the scalability of the system to many devices by simulating input and output of the embedded devices and monitoring the virtual device(s) for errors and performance problems. The system greatly simplifies testing and recreation of real-world scenarios that would be hard to reproduce with physical devices.

In some embodiments, the device virtualization system provides reports to the device manufacturer based on shared data available to the virtual device or devices. Because much of the storage for the embedded device is centralized at the virtual device, the device manufacturer can mine a wealth of data that would be difficult to obtain with previous embedded devices. For example, the way each user has configured the device, the functions most frequently used, and other valuable information may all be available by accessing a central data store associated with the virtual device. In addition, the manufacturer can request collection of additional data through journaling and logging of embedded device requests as they occur. In this way, the manufacturer can determine information about most commonly used features, typical configurations, common problems, and so on.

In some embodiments, the device virtualization system provides a subscription model to users of the embedded device for compensating the device manufacturer for usage of the virtual device. For example, the virtual device may provide scalable processing or quantity of storage based on a subscription tier purchased by the user. A user can get more functionality from the embedded device by moving to a more feature rich subscription plan causing the manufacturer to enable different features on the virtual device.

In some embodiments, the device virtualization system performs automatic updates at the virtual device that relieve users of embedded devices from maintenance and updating of the embedded devices. By updating software and other information used at the virtual device, the embedded device behavior changes and the user benefits from any updates provided.

From the foregoing, it will be appreciated that specific embodiments of the device virtualization system have been described herein for purposes of illustration, but that various modifications may be made without deviating from the spirit and scope of the invention. Accordingly, the invention is not limited except as by the appended claims.

We claim:

1. A virtualization system, comprising:
at least one memory and at least one processor, the at least one memory and the at least one processor being respectively configured to store and execute instructions for performing operations, the operations comprising:
receiving, at the virtualization system, information identifying an embedded device that relies upon the virtualization system for processing to facilitate a function provided via the embedded device;
identifying, by the virtualization system, a particular type and a particular instance of the embedded device;
loading a set of application-specific instructions related to the identified type of the embedded device from a data store having sets of application-specific instructions for multiple types of embedded devices, the loaded set of application-specific instructions being for execution on the virtualization system;
receiving, at the virtualization system, input from one or more peripherals of the embedded device;
processing, at the virtualization system, the received input with the loaded set of application-specific instructions; and sending one or more results of the processing of the received input with the loaded set of application-specific instructions from the virtualization system to the embedded device.

2. The virtualization system of claim 1, wherein receiving the information identifying the embedded device includes:
receiving a device identifier that identifies a type of the embedded device, wherein the information was previously provided by a manufacturer of the embedded device to an operator of the virtualization system.

3. The virtualization system of claim 1, wherein the embedded device is a medical diagnostic device.

4. The virtualization system of claim 1, wherein the embedded device is an audio-visual entertainment device.

5. The virtualization system of claim 1, wherein the operations further comprise:
updating the set of application-specific instructions related to the embedded device transparently to the embedded device.

6. The virtualization system of claim 1, wherein the operations further comprise:
performing operations for multiple embedded devices at a same time.

7. A virtualization device, comprising:
a processor and memory configured to execute instructions, including instructions that:
receive, at the virtualization device, device information that identifies a particular type and a particular instance of an embedded device that is associated with the virtualization device and for which the virtualization device is to perform at least a portion of processing for an output to be provided via the embedded device;
loading, based at least in part on the received device information, application-specific processing instructions related to the identified type of embedded device for execution by the virtualization device, the application-specific processing instructions for performing the processing for the output to be provided via the embedded device;
receiving, at the virtualization device, input forwarded to the virtualization device by the embedded device;
in response to the receipt of the input forwarded to the virtualization device by the embedded device, generating a reply to the embedded device, including:
processing, at the virtualization device, the input forwarded to the virtualization device by the embedded device with the application-specific instructions related to the identified type of embedded device; and
generating, at the virtualization device, the output to be provided via the embedded device based on the application-specific instructions related to the identified type of embedded device and on the input forwarded to the virtualization device by the embedded device; and
sending from the virtualization device to the embedded device, the reply to the embedded device.

8. The virtualization device of claim 7, wherein the input forwarded to the virtualization device by the embedded device is based on input to the embedded device from one or more peripherals of the embedded device.

9. The virtualization device of claim 7, wherein the embedded device is a set-top device, a medical diagnostic device, and/or a household appliance.

10. The virtualization device of claim 7, wherein the application-specific instructions include instructions for storing audio/visual data for the embedded device.

11. The virtualization device of claim 7, wherein the reply to the embedded device includes the output to be provided via the embedded device and an indication of a completion status of the processing of the input forwarded to the virtualization device by the embedded device.

12. The virtualization device of claim 7, wherein the input forwarded to the virtualization device by the embedded device comprises one or more types of input data captured from an environment surrounding the embedded device.

13. The virtualization device of claim 7, wherein the virtualization device and the embedded device are communicatively coupled via the Internet.

14. The virtualization device of claim 7, wherein the input forwarded to the virtualization device by the embedded device represents a request for the virtualization device to perform the processing on behalf of the embedded device.

15. The virtualization device of claim 7, wherein:
loading the application-specific processing instructions includes:
loading the application-specific processing instructions from a data store having application-specific instructions for multiple different types of embedded devices.

16. A computer-implemented method for virtualization of embedded devices, the method comprising:
receiving, at a virtualization server device, information identifying an embedded device, wherein the embedded device is to employ processing of the virtualization server device to provide a user output;
identifying, by the virtualization server device, a particular type and a particular instance of the embedded device;
loading a set of application-specific instructions related to the identified type of the embedded device from a data store having sets of application-specific instructions for multiple types of embedded devices, the loaded set of application-specific instructions being for execution on the virtualization server device, and for performing the processing to provide the user output via the embedded device;
receiving, at the virtualization server device, input from the embedded device;
processing, at the virtualization server device, the received input from the embedded device with the loaded set of application-specific instructions; and
sending one or more results of the processing of the received input from the embedded device with the loaded set of application-specific instructions from the virtual server device to the embedded device.

17. The method of claim 16, wherein identifying the particular type and the particular instance of the embedded device includes:
determining the particular type of the embedded device; and
determining an instance identifier of the embedded device, wherein the instance identifier distinguishes different instances of embedded devices of the particular type.

18. The method of claim 16, wherein the embedded device is an ultrasound machine and/or a MRI machine.

19. The method of claim 16, wherein sending the one or more results of the processing includes:
providing the one or more results of the processing to one or more output peripherals coupled to the embedded device.

20. The method of claim 16, wherein one or more results of the processing includes a result code indicative of whether the processing of the received input was successful.

\* \* \* \* \*